US008730061B2

(12) United States Patent
Wang et al.

(10) Patent No.: US 8,730,061 B2
(45) Date of Patent: May 20, 2014

(54) METHOD FOR CALIBRATING AN ON-BOARD UNIT AND A TEST DEVICE, A METHOD FOR WIRELESS TOLL COLLECTION

(75) Inventors: Yanfeng Wang, Shanghai (CN); Dawei Guo, Shanghai (CN); Jiazhou Liu, Shanghai (CN)

(73) Assignee: Beken Corporation, Shanghai (CN)

( * ) Notice: Subject to any disclaimer, the term of this patent is extended or adjusted under 35 U.S.C. 154(b) by 510 days.

(21) Appl. No.: 12/981,526

(22) Filed: Dec. 30, 2010

(65) Prior Publication Data

US 2012/0166256 A1 Jun. 28, 2012

(30) Foreign Application Priority Data

Dec. 23, 2010 (CN) .......................... 2010 1 0602327

(51) Int. Cl.

| | |
|---|---|
| ***G08G 1/00*** | (2006.01) |
| ***G08G 1/01*** | (2006.01) |
| ***G07B 15/02*** | (2011.01) |
| ***H04B 1/40*** | (2006.01) |
| ***H04B 7/00*** | (2006.01) |

(52) U.S. Cl.
USPC ........... 340/928; 340/933; 340/935; 235/384; 455/77; 455/522

(58) Field of Classification Search
USPC ........................................... 235/384; 455/522
See application file for complete search history.

(56) References Cited

U.S. PATENT DOCUMENTS

| | | | | |
|---|---|---|---|---|
| 5,451,758 | A * | 9/1995 | Jesadanont | 235/384 |
| 5,640,156 | A * | 6/1997 | Okuda et al. | 340/928 |
| 5,777,565 | A * | 7/1998 | Hayashi et al. | 340/928 |
| 7,148,699 | B1 * | 12/2006 | Stark | 324/601 |
| 7,738,904 | B1 * | 6/2010 | Chien et al. | 455/522 |
| 2005/0270175 | A1 * | 12/2005 | Peddie et al. | 340/907 |

* cited by examiner

*Primary Examiner* — Jennifer Mehmood
*Assistant Examiner* — Pameshanand Mahase
(74) *Attorney, Agent, or Firm* — Perkins Coie LLP; Aaron Wininger

(57) ABSTRACT

A method comprises: disposing an on-board unit at a preset relative position with respect to a road-side unit; transmitting a signal by the road-side unit; receiving the signal by the on-board unit and detecting a strength of the received signal; calculating, by the on-board unit, a calculated strength of the received signal according to the detected strength of the received signal; storing the calculated strength of the received signal in a memory accessible by the on-board unit; using the stored calculated strength of the received signal to determine if payment of a toll should be made.

9 Claims, 6 Drawing Sheets

METHOD FOR CALIBRATING AN ON-BOARD UNIT AND A TEST DEVICE, A METHOD FOR WIRELESS TOLL COLLECTION

CLAIM OF PRIORITY

This application claims priority to Chinese Application number 201010602327.8 entitled "A METHOD FOR CALIBRATING AN ON-BOARD UNIT AND A TEST DEVICE, A METHOD FOR WIRELESS TOLL COLLECTION", filed on Dec. 23, 2010, which is incorporated herein by reference.

TECHNICAL FIELD

The present application relates to communication, particularly to dedicated short range communication.

BACKGROUND OF THE INVENTION

In Electronic Toll Collection (ETC) systems, an on-board unit (OBU) transmits an indication signal indicating payment of a toll upon receipt of a wake-up signal from a road-side unit (RSU).

However, OBUs can have different signal reception sensitivities (also referred to wake up sensitivity) which can cause negative effects. For example, vehicles A and B are traveling one after another (e.g., B after A), an OBU installed on the vehicle B (referred to OBU B) is more sensitive than the one on the vehicle A (referred to OBU A). Therefore, the OBU B awakes and transmits a signal to the RSU indicating payment of a toll before than the OBU A, which causes a toll bar to rise to let vehicle A pass and then lower to bar vehicle B.

Accordingly, a method for calibrating OBUs and a method for ETC are therefore desirable.

BRIEF DESCRIPTION OF THE INVENTION

To this end, according to an embodiment of the invention, a method comprises: receiving a first signal transmitted by a first road-side unit and detecting a strength of the first signal with an on-board unit disposed at a preset position; calculating, by the on-board unit, a calculated strength of the first signal according to the detected strength of the first signal; storing the calculated strength of the first signal in a memory accessible by the on-board unit; receiving a second signal transmitted by a test device and detecting a strength of the second signal with the on-board unit; calculating, by the on-board unit, a calculated strength of the second signal according to the detected strength of the second signal; and adjusting at least one of a transmission strength of the second signal and a channel between the on-board unit and the test device until the calculated strength of the second signal is equal to the stored strength of the first signal.

According to an embodiment of the invention, a method for electronic toll collection comprises: receiving, by an on-board unit, a signal from a road-side unit in an electronic toll collection system; and detecting a strength of the received signal by an on-board unit; calculating, by the on-board unit, a calculated strength of the received signal according to the detected strength of the signal; comparing the calculated strength of the received signal with a reference strength; transmitting, by the on-board unit, an indication signal indicating payment of a toll to the road-side unit paying the toll by the on-board unit if the calculated strength of the received signal is stronger than or equal to the reference strength.

According to an embodiment of the invention, an on-board unit in an electronic toll collection system comprises: a primary module configured to receive a signal transmitted by a road-side unit; a processor configured to detect a strength of the received signal and calculate a calculated strength of the received signal according to the detected strength of the received signal; wherein the processor is further configured to compare the calculated strength of the signal with a reference strength; and the primary module is further configured to transmit an indication signal indicating payment of a toll to the road-side unit if the calculated strength of the signal is stronger than or equal to the retrieved strength.

According to an embodiment of the invention, an on-board unit in an electronic toll collection system comprises: a wake-up circuit; a primary module; a processor and a memory; wherein the wake-up circuit is configured to waken the primary module upon receipt of a wake-up signal from a road-side unit; the primary module includes: a match circuit configured to receive a signal from a road-side unit; a low noise amplifier configured to amplify an amplitude of the signal to generate an amplified signal; an automatic gain controller configured to receive the amplified signal and adjust an amplitude of the amplified signal so as to generate a gain-controlled signal; an analog-to-digital converter configured to receive and convert the gain-controlled signal to a digital signal; the memory is configured to store a reference strength; the processor is configured to detect a strength of the digital signal, and calculate a calculated strength of the digital signal following an equation below: $P_{in}=(20\log(RSSI)+x-y)-G_{agc}$, where $P_{in}$ the calculated strength of the digital signal, RSSI is the detected strength of the digital signal, $G_{agc}$ is a gain achieved by the automatic gain controller, x is a dBV-to-dBm conversion factor and y is a gain of the analog-to-digital conversion; the processor is further configured to compare the calculated strength of the digital signal with the reference strength and, if the calculated strength of the digital signal is stronger than or equal to the reference strength, instruct the primary module to transmit an indication signal indicating payment of a toll to the road-side unit.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-know structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Terms are defined as following only for conciseness in description below:

Wake-up Distance ($D_s$): a distance between an OBU and a RSU when a primary module on the OBU is woken, the primary module will be discussed in detail below;

Payment Distance: a distance between an OBU and a RSU when the OBU transmits an indication signal indicating payment of a toll;

Longest Payment Distance ($D_d$): in an embodiment of the invention, an OBU is not allowed to transmit the indication signal when the distance between the OBU and the RSU is longer than the longest payment distance.

Figure 1:
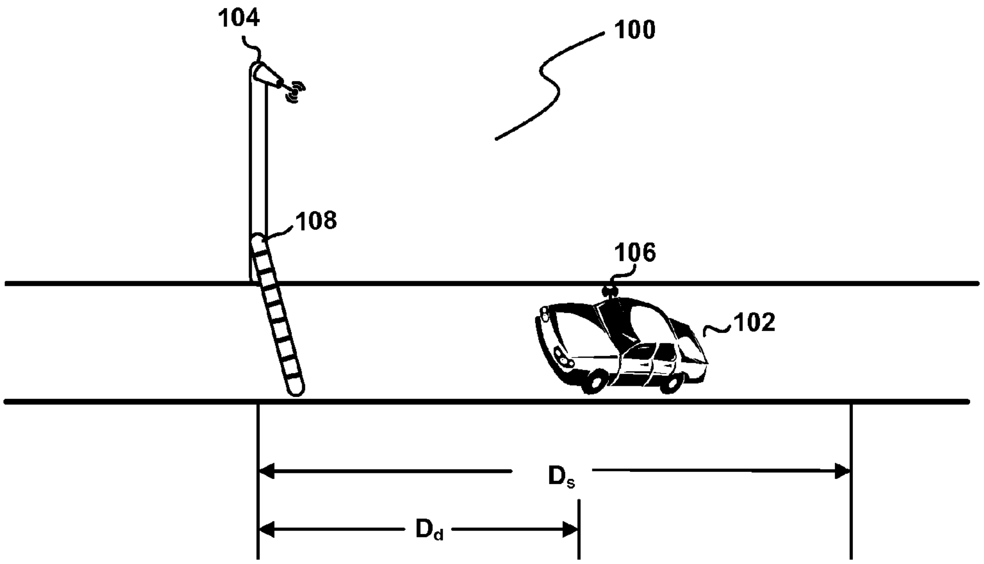
FIG. 1 is a drawing illustrating an ETC system in use according to an embodiment of the invention.

FIG. 1 is a drawing illustrating an ETC system 100 in use according to an embodiment of the invention. A RSU 104 periodically broadcasts a signal, e.g., an amplitude switch keying (ASK) signal, which has a preamble used as a wake-up signal. A vehicle 102 traveling on a road is equipped with an OBU 106 for ETC.

Figure 2:
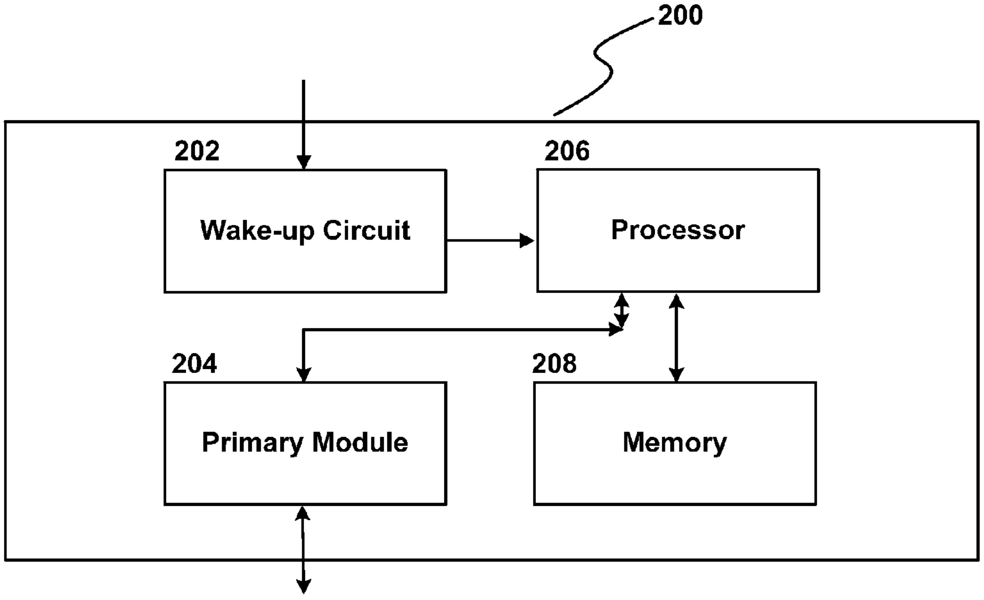
FIG. 2 is a block diagram illustrating an exemplary OBU according to an embodiment of the invention.

FIG. 2 is a drawing illustrating an OBU according to an embodiment of the invention. In an embodiment, if a wake up signal from a RSU is received, a wake-up circuit 202 wakes a processor 204 which then awakes a primary module 204. The primary module 204 is configured to transmit an indication signal indicating payment of a toll to the RSU 104 at a suitable time determined by the processor 206. When the payment is successful, a toll bar 108 raises automatically to allow vehicle 102 to pass. In another embodiment, a different indication of successful payment may be used, e.g., activation of a green light. A memory 208, e.g., an EEPROM, is configured to store a calculated strength as discussed below. In another embodiment of the invention, the memory 208 in the OBU 200 can be omitted; a memory being independent from and accessible by the OBU 200 is provided instead.

Figure 3:
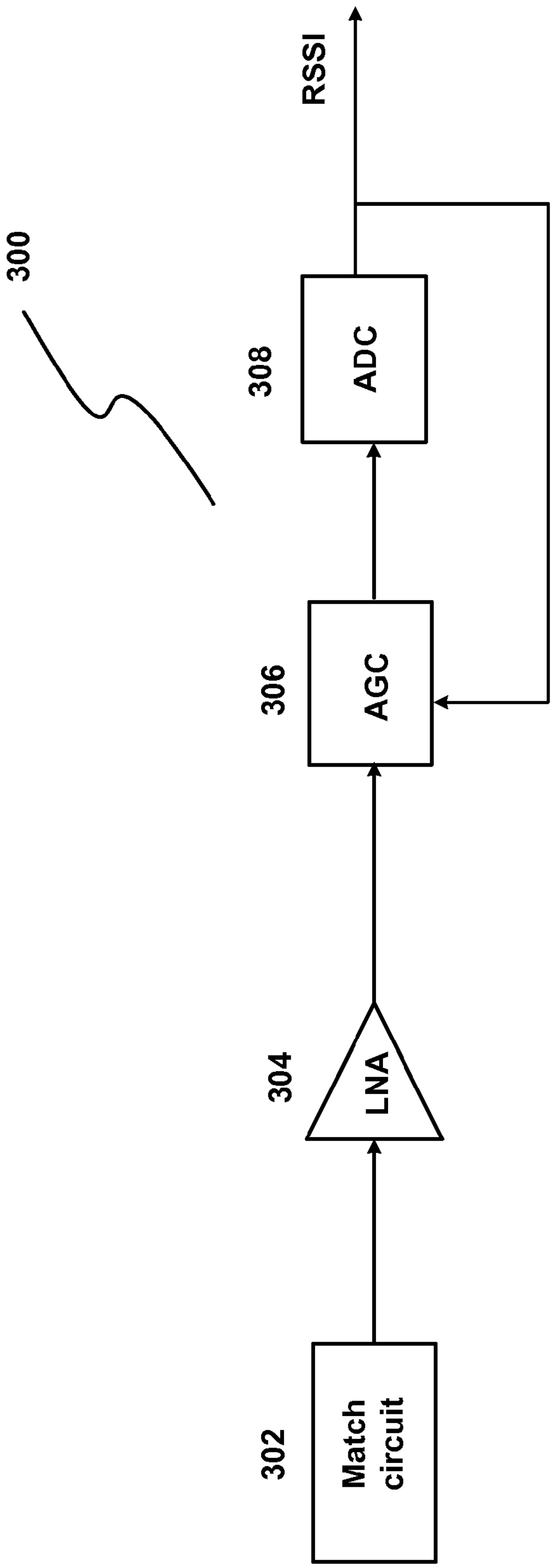
FIG. 3 is a block diagram illustrating a portion of a primary module of an OBU according to an embodiment of the invention.

FIG. 3 is a block diagram illustrating a portion 300 of a primary module of an OBU according to an embodiment of the invention.

The portion 300 configured for signal reception receives a signal through a match circuit 302. A low noise amplifier (LNA) 2042 is configured to amplify an amplitude of the received signal to generate an amplified signal. An automatic gain controller 306 is coupled to the LNA 304 to ensure that an amplitude of an input of an analog-to-digital converter (ADC) 308 is suitable. A detected strength of the received signal can be determined from a digital signal output by the ADC 308 in such a form as receive signal strength indicator (RSSI). A gain achieved by the match circuit 302 and LNA 304 varies with different OBUs, which causes different payment distances among conventional OBUs.

In an embodiment of the invention, payment distances for different OBUs are limited to a preset distance range. In other words, the longest payment distances for different OBUs are equal. In an embodiment of the invention, an OBU in use does not transmit a signal indicating payment of a toll until a distance from the OBU to a RSU is no longer than $D_d$ which is about 5.5 meters to 6.5 meters.

Figure 4:
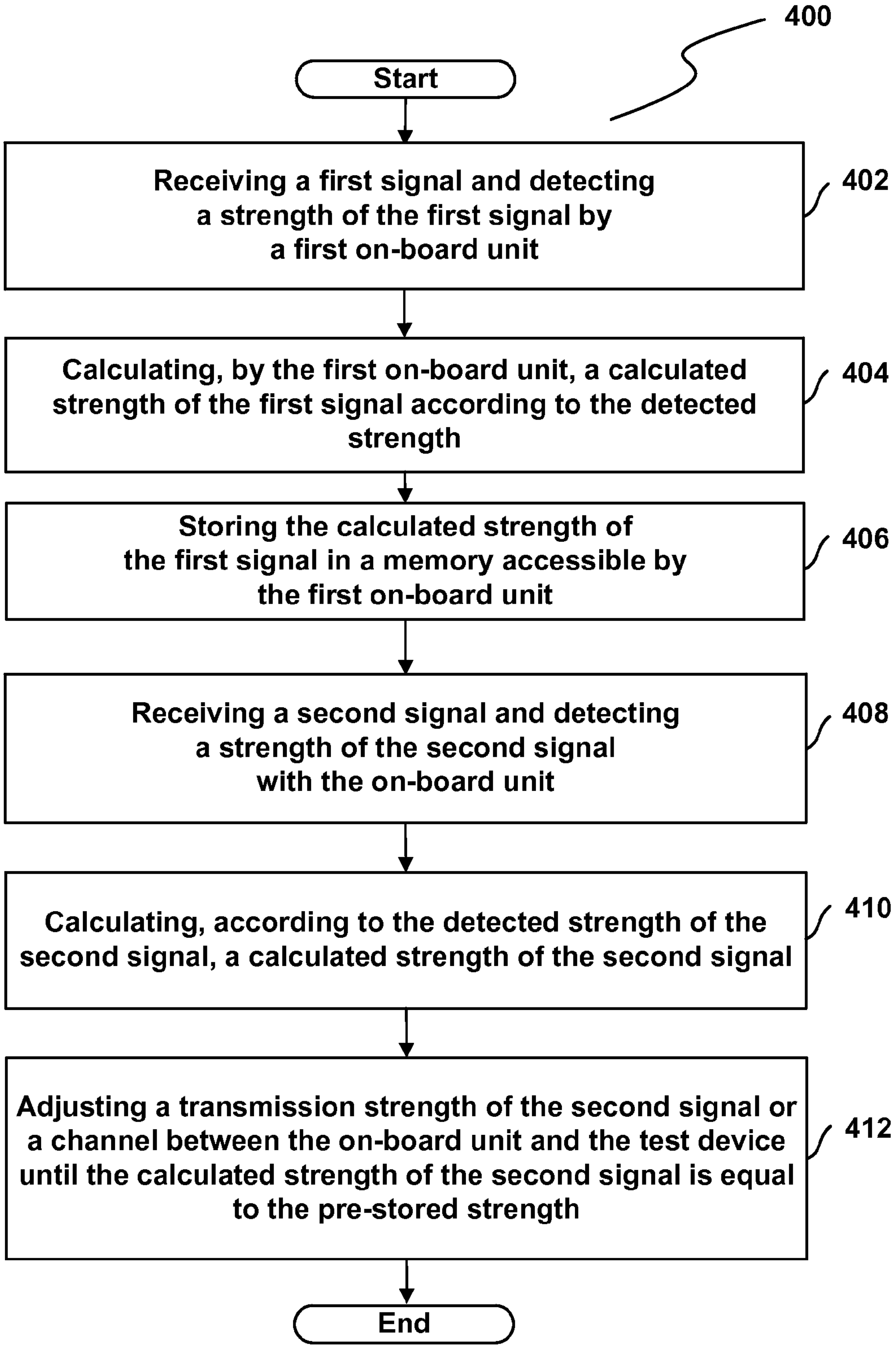
FIG. 4 is a flowchart of a method for calibrating a test device according to an embodiment of the invention.

FIG. 4 is a flowchart of a method 400 for calibrating a test device according to an embodiment of the invention. A first OBU, e.g., OBU 106 is disposed at a preset position with respect to a RSU, e.g., RSU 104. According to an embodiment of the invention, a distance between the disposed OBU 106 and the RSU 104 (i.e., $D_d$ in FIG. 1) is about 5.5 meters to about 6.5 meters, e.g., 6 meters. The RSU 104, i.e., a first RSU, broadcasts a signal (also referred to as a first signal) periodically.

A block 402, the OBU 106 receives the first signal from the RSU 104. A detected strength of the first signal, e.g., RSSI (dBm), can be obtained by a processor from an output of the ADC 308. In an embodiment of the invention, the detected strength is buffered in a memory (e.g., EEPROM) (REG7 <7:0>) as a hexadecimal value for further process.

It is noted that a gain of the match circuit 302 and a gain of the LNA 304 cannot be predicted, and vary with different OBUs. Because of that, the detected strength cannot well convey a strength of the signal at an antenna of the OBU 106, i.e., before being affected by internal circuits of the OBUs, hereinafter referred to as actual receive strength.

At block 404, the OBU 106 calculates, with a processor, a calculated strength of the first signal according to the detected strength of the first signal. In accordance with an embodiment of the invention, the calculated strength is equivalent to an actual strength of the first signal and follows an equation (1) below:

$$P_{in}=(20\lg(\mathrm{RSSI})+x-y)-G_{agc} \quad (1)$$

where $P_{in}$ is the calculated strength of the received signal in dBm, RSSI is the detected strength of the received signal in dBm and decimal, $G_{agc}$ is a gain achieved by the AGC 306 in dB and stored in a register, e.g., REG2<6:0>, x is a dBV-to-dBm conversion factor and y is a gain of an analog-to-digital conversion in the ADC 308. DBV is a unit of measurement expressing the relationship of decibels to voltage referenced to 1 volt.

In an embodiment of the invention, the calculation of the calculated strength repeats for several times, e.g., 4 times, and an average of the 4 results is taken as a result of block 404.

According to an embodiment of the invention, one of RSSI and $G_{agc}$ or both of them may be stored as hexadecimal; a hexadecimal-to-decimal conversion is then needed if so before applying RSSI and/or $G_{agc}$ to equation (1).

According to an embodiment of the invention, x takes a value at 13 and y takes a value at 46.

Noting the relationship between the actual strength and the detected strength of the received first signal may depend on specific configuration of the internal circuits of an OBU, in other embodiments of the invention, other expressions may be used to calculate the calculated strength.

At block 406, the OBU 106 stores the calculated strength of the first signal in a memory accessible by the OBU 106. According to an embodiment of the invention, the memory is integrated on the OBU 106. Alternatively, the memory may be external and accessible by the OBU 106 via a wireless connection or other connections.

In an embodiment of the invention, the OBU 106 includes a wake-up circuit and a primary module, the primary module is woken before block 402.

Figure 5:
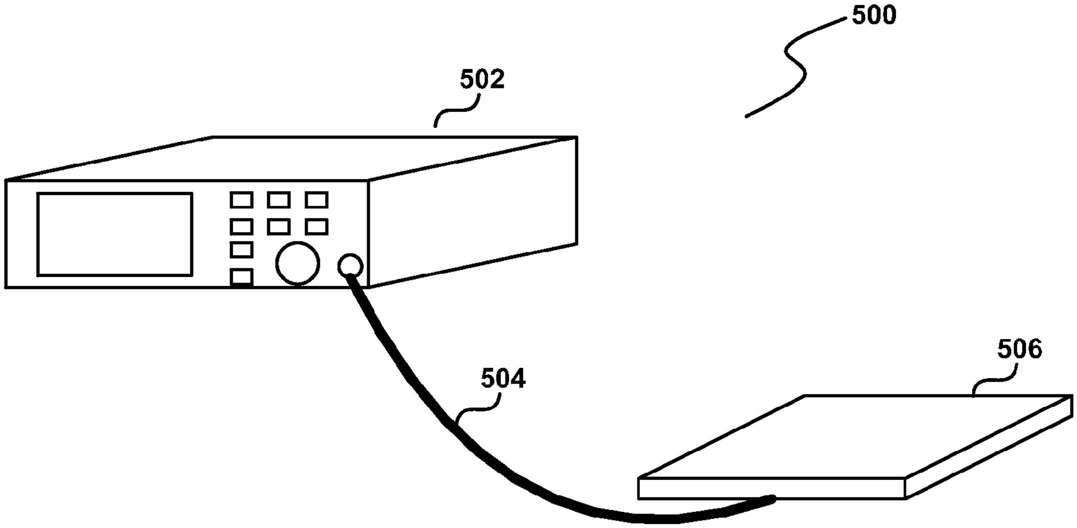
FIG. 5 is a drawing illustrating a test device according to an embodiment of the invention.

After block 406, the OBU 106 is ready to calibrate a test device. FIG. 5 is a drawing illustrating a test device according to an embodiment of the invention.

The test device 500 includes a signal generator 502 adapted to generate a second signal simulating the first signal sent by a RSU, e.g., an ASK signal. A cable 504 is configured to convey the test signal to a panel antenna 506.

In practice, the test device 500 may be configured in accordance with blocks 408-412 in FIG. 4.

An OBU (e.g., the OBU 106 in FIG. 1) for which a calculated strength has been stored may be disposed on the panel antenna 506 when the signal generator 502 is transmitting a second signal. At bock 408, the OBU 106 receives the second signal and detects a strength of the second signal with a processor. At block 410, the OBU 106 calculates a calculated strength of the second signal according to the detected strength. The calculation may be based on the equation (1) as discussed above. According to an embodiment of the invention, the test device 500 may transmits the test signal at any transmission strength at first. At block 412, in case the calculated strength of the received second signal is stronger than the strength pre-stored for OBU 106, the transmission strength of the second signal will be decreased or otherwise increased. Finally, the calculated strength of the received second signal is equal to the pre-stored strength. The transmission strength of the second signal now is referred to as a determined transmission strength, a channel between the test device 500 and the OBU 106 remains constant and can be referred to as a determined channel.

Considering the RSU 104 and a channel between the RSU 104 and the OBU 106 as a system, and considering the test device 500 and a channel between the test device 500 and the OBU 106 as another, the two systems are the same for the OBU 106 in terms of the calculated strength of received signal. In other words, if the first OBU (i.e., OBU 106) is replaced by a second OBU, the second OBU will show a calculated strength equal to a calculated strength pre-stored for the second OBU.

After the process illustrated in FIG. 4 completes, the calibration of the test device 500 is finished and the test device 500 is now ready to further configure other OBUs.

According to another embodiment of the invention, a RSU may be employed as a test device. Accordingly, at block 412, the transmission strength of the second signal may be kept constant while a distance from the RSU to OBU 106 is changed until the calculated strength of the second signal is equal to the strength pre-stored for OBU 106.

Figure 6:
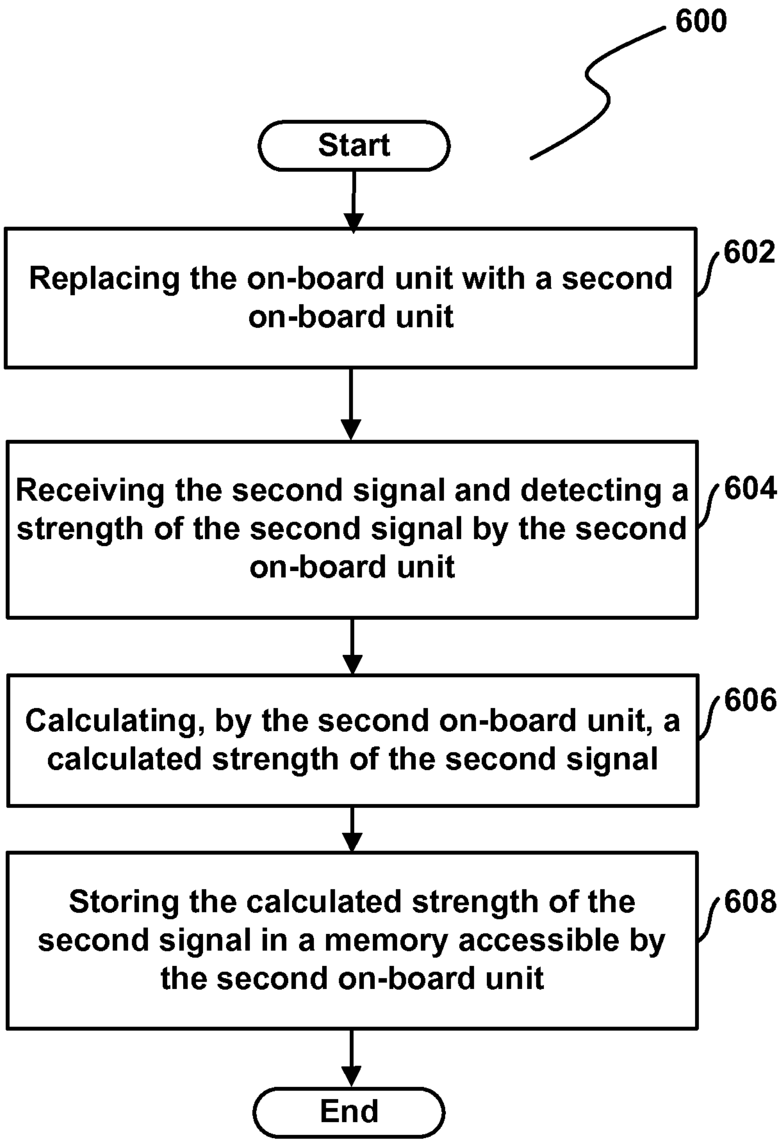
FIG. 6 is a flowchart of a method for calibrating OBUs according to an embodiment of the invention.

In an embodiment of the invention, up to several hundred OBUs may be manufactured as samples; at least one of which can be used in method 400 to calibrate the test device 500. OBUs from mass production may be configured by the test device 500, which will be described in detail below with reference to FIG. 6.

At block 602, an OBU (e.g., the OBU 106 in FIG. 1) used to configure the test device 500 is displaced by a second OBU. At that time, the test device 500 still transmits the second signal with the determined transmission strength, the channel between the second OBU and the test device 500 is the same as the one between the OBU 106 and the test device 500.

At block 604, the second OBU receives the second signal via the determined channel and detects a strength of the second signal.

At block 606, the second OBU calculates a calculated strength of the second signal. As discussed above, if the second OBU is disposed at a distance $D_d$ from the RSU 104 (i.e., the first OBU) in FIG. 1, a calculated strength of a signal received from the RSU 104 will be the same as the calculated strength calculated at block 606.

At block 608, the calculated strength calculated at block 606 is stored for the second OBU. When utilized for ETC, the second OBU may use the pre-stored strength as a threshold to determine if an indication signal indicating payment of a toll shall be transmitted.

Figure 7:
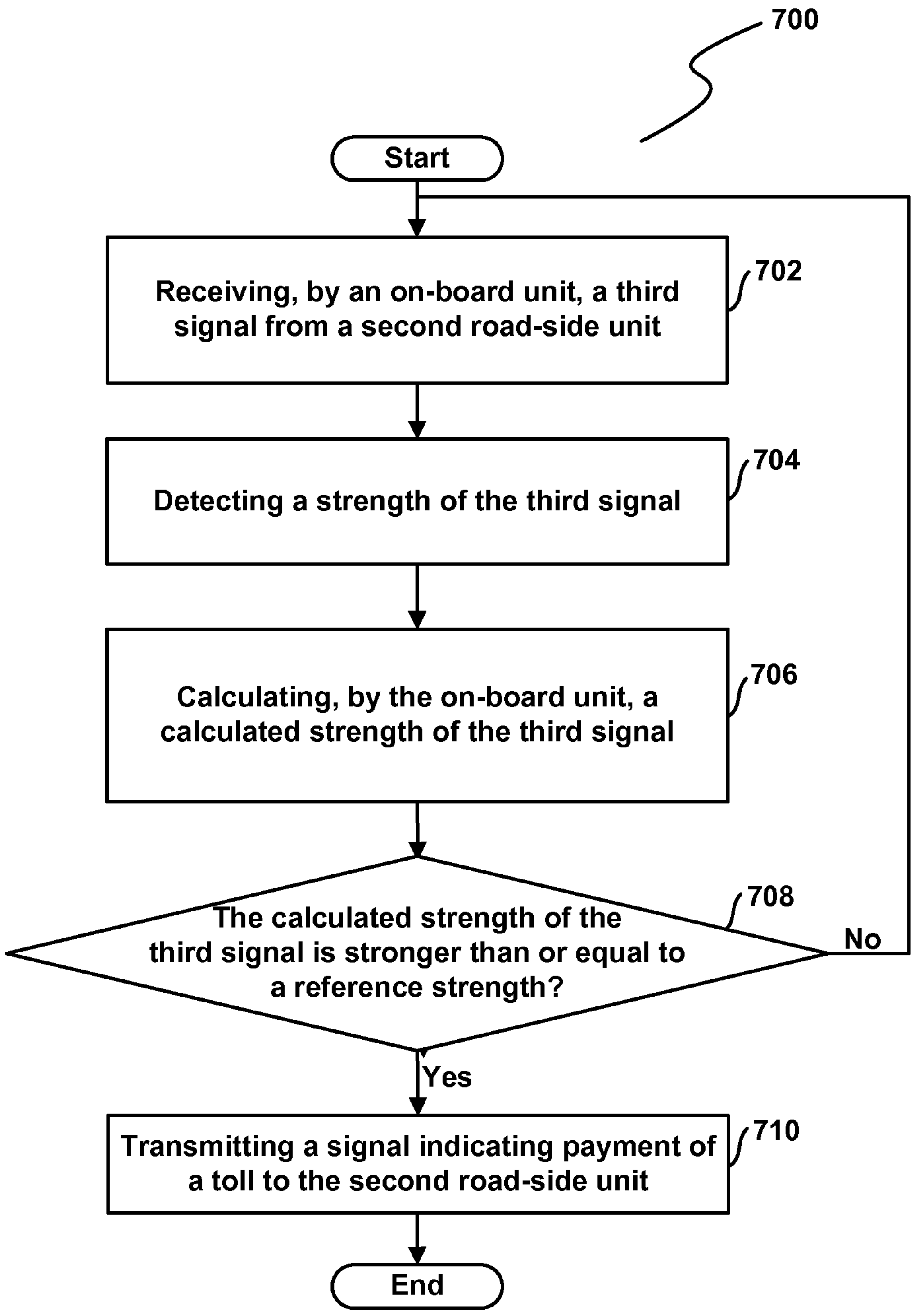
FIG. 7 is a flowchart of a method for ETC according to an embodiment of the invention.

FIG. 7 is a flowchart illustrating a method 700 for ETC according to an embodiment of the invention. An OBU is installed on a vehicle (e.g., vehicle 102) traveling on the road and approaching a second RSU. In an embodiment of the invention, the second RSU may be the RSU 104 in FIG. 1 or another. In an embodiment of the invention, the OBU is calibrated as described with reference to FIG. 6. In another embodiment of the invention, the OBU is calibrated as described with reference to FIG. 4, particularly to blocks 402-406.

In an embodiment of the invention, when the OBU 106 includes a wake-up circuit and a primary module, a receiver module in the primary module is woken before block 702 in FIG. 7. As an RSU (e.g., RSU 104 in FIG. 1) broadcasts an ASK signal periodically, the receiver module may be woken in a period N and the method 400 refers to a period N+1.

At block 702, the OBU 106 receives a third signal from the second RSU.

At block 704, the OBU 106 detects a strength of the received third signal, so as to get a detected strength of the received third signal, e.g., RSSI.

At block 706, the OBU 106 calculates a calculated strength of the third signal according to the detected strength. According to an embodiment of the invention, the OBU 106 employs the equation (1) in the calculation.

At block 708, by comparing the calculated strength of the third signal with a pre-stored strength, the OBU 106 determines if the calculated strength is stronger or equal to the pre-stored strength. If so, which means the distance between the vehicle 102 and the RSU 104 is shorter than or equal to $D_d$, the OBU 106 will transmit a signal to the RSU indicating payment of a toll at block 710. Otherwise, the OBU 106 waits for a next broadcast signal (e.g., third signal described above) from the RSU 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:

receiving a first signal transmitted by a first road-side unit and detecting a strength of the first signal with a first on-board unit disposed at a preset position;

calculating, by the first on-board unit, a calculated strength of the first signal according to the detected strength of the first signal;

storing the calculated strength of the first signal in a memory accessible by the first on-board unit;

receiving a second signal transmitted by a test device and detecting a strength of the second signal with the first on-board unit;

calculating, by the first on-board unit, a calculated strength of the second signal according to the detected strength of the second signal; and adjusting at least one of a transmission strength of the second signal and a channel between the first on-board unit and the test device until the calculated strength of the second signal is equal to the stored strength of the first signal;

wherein calculating a calculated strength of the first signal according to the detected strength of the first signal comprising:

calculating the calculated strength of the first signal following an equation below:

$$P_{in}=(20\log(\mathrm{RSSI})+x-y)-G_{agc}$$

where $P_{in}$ is the calculated strength of the first signal, RSSI is the detected strength of the first signal, $G_{agc}$ is a gain achieved by an automatic gain controller in the first on-board unit, x is a dBV-to-dBm conversion factor and y is a gain of an analog-to-digital conversion.

2. The method of claim 1, further comprising:

receiving the second signal and detecting a strength of the second signal by a second on-board unit;

calculating, by the second on-board unit, a calculated strength of the second signal according to the detected strength of the second signal;

storing the calculated strength of the second signal in a memory accessible by the second on-board unit.

3. The method of claim 2, further comprising:

receiving a third signal from a second road-side unit in an electronic toll collection system and detecting a strength of the third signal with the second on-board unit;

calculating, according to the detected strength of the third signal, a calculated strength of the third signal by the second on-board unit;

comparing the calculated strength of the third signal with the calculated strength of the second signal;

transmitting, by the second on-board unit, an indication signal indicating payment of a toll to the second road-side unit if the calculated strength of the third signal is stronger than or equal to the calculated strength of the second signal.

4. The method of claim 1, wherein adjusting the channel between the first on-board unit and the test device comprises changing a distance from the test device to the first on-board unit.

5. The method of claim 1, wherein the first on-board unit is disposed at such a position that a distance from the position to the first road-side unit is about 5.5 meters to about 6.5 meters.

6. A method for electronic toll collection, comprising:

receiving a signal from a road-side unit and detecting a strength of the signal by an on-board unit;

calculating, by the on-board unit, a calculated strength of the signal according to the detected strength of the signal;

comparing the calculated strength of the signal with a reference strength;

transmitting, by the on-board unit, an indication signal indicating payment of a toll to the road-side unit if the calculated strength of the signal is stronger than or equal to the reference strength;

wherein calculating the calculated strength of the signal following an equation below:

$$P_{in}=(20\log(\mathrm{RSSI})+x-y)-G_{agc}$$

where $P_{in}$ is the calculated strength of the first signal, RSSI is the detected strength of the first signal, $G_{agc}$ is a gain achieved by an automatic gain controller in the first on-board unit, x is a dBV-to-dBm conversion factor and y is a gain of an analog-to-digital conversion.

7. An on-board unit in an electronic toll collection system, comprising:

a primary module configured to receive a signal transmitted by a road-side unit;

a processor configured to detect a strength of the signal and calculate a calculated strength of the signal according to the detected strength of the signal;

wherein the processor is further configured to compare the calculated strength of the signal with a reference strength; and the primary module is further configured to transmit an indication signal indicating payment of a toll to the road-side unit if the calculated strength of the signal is stronger than or equal to the retrieved strength;

wherein the processor is configured to calculate the calculated strength of the received signal following an equation below:

$$P_{in}=(20\log(\mathrm{RSSI})+x-y)-G_{agc}.$$

8. The on-board unit of claim 7, further comprising:

a memory accessible by the processor configured to store the reference strength.

9. An on-board unit in an electronic toll collection system, comprising:

a wake-up circuit;

a primary module;

a processor and a memory;

wherein the wake-up circuit is configured to activate the processor upon receipt of a wake-up signal from a road-side unit, wherein the processor is configured to wake the primary module upon activation;

the primary module includes:

a match circuit configured to receive a signal from a road-side unit;

a low noise amplifier configured to amplify an amplitude of the signal to generate an amplified signal;

an automatic gain controller configured to receive the amplified signal and adjust an amplitude of the amplified signal so as to generate a gain-controlled signal;

an analog-to-digital converter configured to receive and convert the gain-controlled signal to a digital signal;

the memory is configured to store a reference strength;

the processor is configured to detect a strength of the digital signal, and calculate a calculated strength of the digital signal following an equation below:

$$P_{in}=(20\log(\mathrm{RSSI})+x-y)-G_{agc}$$

where $P_{in}$ is the calculated strength of the digital signal, RSSI is the detected strength of the digital signal, $G_{agc}$ is a gain achieved by an automatic gain controller x is a dBV-to-dBm conversion factor and y is a gain of an analog-to-digital conversion the processor is further configured to compare the calculated strength of the digital signal with the reference strength and, if the calculated strength of the digital signal is stronger than or equal to the reference strength, instruct the primary module to transmit an indication signal indicating payment of a toll to the road-side unit.

* * * * *